United States Patent [19]

Ando et al.

[11] 3,725,347
[45] Apr. 3, 1973

[54] LINEAR POLYAMIDES HAVING HIGH GLASS TRANSITION TEMPERATURE PREPARED 4-(3-AMINO-PROPOXY)-PHENYL-3-PROPYLAMINE

[75] Inventors: Tadanao Ando, Hiyogo; Seiichi Kataoka; Isao Shiihara, both of Osaka, all of Japan

[73] Assignee: Agency of Industrial Science & Technology, Tokyo, Japan

[22] Filed: Oct. 6, 1971

[21] Appl. No.: 187,174

Related U.S. Application Data

[63] Continuation-in-part of Ser. No. 870,673, Dec. 24, 1969, abandoned.

[52] U.S. Cl..........260/47 CZ, 260/33.4 P, 260/78 R
[51] Int. Cl. ..............................................C08g 20/20
[58] Field of Search...........................260/47 CZ, 78

[56] References Cited

UNITED STATES PATENTS 3,197,434  7/1965  Preston et al..........................260/47

3,206,438  9/1965  Jamison................................260/78

Primary Examiner—William H. Short
Assistant Examiner—L. L. Lee
Attorney—Kurt Kelman

[57] ABSTRACT

A linear polyamide having a high glass transition temperature composed essentially of monomer units randomly distributed in the polymer chain, said monomer units having the formula

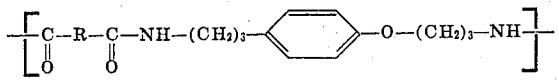

or

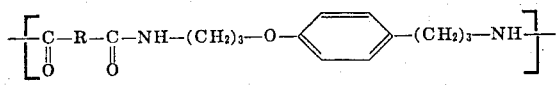

wherein R is a member selected from the group consisting of aliphatic, aromatic and aliphatic-aromatic radicals.

1 Claim, No Drawings

LINEAR POLYAMIDES HAVING HIGH GLASS TRANSITION TEMPERATURE PREPARED 4-(3-AMINO-PROPOXY)-PHENYL-3-PROPYLAMINE

This application for U.S. Letters Patent is a continuation-in-part of application Ser. No. 870,673, filed Dec. 24, 1969, now abandoned.

This invention relates to a linear polyamide having a high glass transition temperature.

Polyamides containing aromatic nuclei can be classified into two groups, one of which contains no methylene group in the main chain thereof, and the other containing methylene groups in said main chain. The polyamide in accordance with the present invention falls within the latter group. Typical well-known poly-amides of the latter group include polyhexamethylene terephthalamide (Nylon 6T), poly-m-xylylene adipamide (Nylon MXD-6), polyhexamethylene adipamide (Nylon 66), and the like. The polyamide of this invention is lower in melting point and can more easily be subjected to melting, heat-condensation and melt-spinning than the aforementioned Nylon 6T, Nylon MXD-6, Nylon 66 and the like.

This polyamide has a low melting point and a high glass transition temperature, which makes it very useful for making fibers, films and other shaped bodies. They are also more easily subjectable to melting, polymerization and condensation, by utilizing 4-(3-aminopropoxy)-phenyl-3-propylamine which is obtained from acrylonitrile and phenol as a raw material which are easily available at low cost as a by-product of the petroleum chemical industry.

The novel polyamide can easily be prepared industrially by carrying out heat-condensation of 4-(3-aminopropoxy)-phenyl-3-propylamine [$H_2N \cdot (CH_2)_3 \cdot O \cdot C_6H_4(CH_2)_3NH_2$] as a diamine constituent with a dicarboxylic acid having the formula

HOOC—R—COOH or an ester thereof, wherein R represents an aliphatic, aromatic or aliphatic-aromatic residual radical.

4-(3aminopropoxy)-phenyl-3propylamine used as a starting material in the process for producing the poylamide of this invention can be prepared by, for example, reacting phenol with acrylonitrile in the presence of a Lewis acid to obtain 4-oxyphenyl-propionitrile which is further reacted with an additional 1 mole of acrylonitrile in the presence of a basic catalyst, for example, tetramethyl ammonium hydroxide, trimethylbenzyl ammonium hydroxide, etc. to produce 4-(2-cyanoethoxy)phenyl-2-propionitrile, and catalytically hydrogenating the thus obtained 4-(2-cyanoethoxy)phenyl-2-propionitrile in the presence of Raney nickel or Raney cobalt catalyst under hydrogen pressure. This procedure permits the production of 4-(3-aminopropoxy)-phenyl-3-propylamine in high yield and, further, can be advantageously carried out on a commercial basis because the raw materials such as phenol and acrylonitrile are easily available at low cost as a by-product in the petroleum chemical industry.

The other raw material, dicarboxylic acids, used in producing the polyamide of the present invention may be any of the aliphatic ω-dicarboxylic acids, aromatic dicarboxylic acids or aliphatic-aromatic dicarboxylic acids, for example, adipic acid, pimelic acid, suberic acid, azelaic acid, sebacic acid, decamethylene-1, 10-dicarboxylic acid, terephthalic acid, isophthalic acid, 1,4-bis(carbomethoxy)benzene, 4,4'-dicarboxydiphenoxy-1,2-ethane, 4,4'-dicarboxydiphenoxy-1,4-butane, and the like. Dimethyl esters, diethyl esters, diphenyl esters, di-acid chlorides, etc. of the above dicarboxylic acids can also be used as raw materials of this invention.

The condensation-polymerization can be carried out by mixing the above 4-(3-aminopropoxy)-phenyl-3-propylamine and an equimolar amount of the dicarboxylic acid or an ester therof (an amount of 5 percent over or below the equimolar amount is acceptable) and heating the resulting mixture at a temperature of from 180°C to 300°C for a period of from 1 to 30 hours thereby effecting the condensation-polymerization reaction to produce a polyamide polymer.

At reaction temperatures below 180°C the 4-(3-aminopropoxy)phenyl-3-propylamine, although a liquid at room temperature, forms a polyamide intermediate with the dicarboxylic acid and there is no or very slow further reaction between the starting materials. At a temperature above 300°C, a decomposition reaction and the condensation reaction take place simultaneously thereby decreasing the degree of polymerization.

A reaction period of from 1 to 2 hours is adequate when the reaction is conducted on a laboratory scale, but the reaction usually requires about 30 hours when a large amount of raw materials are used on a commercial scale.

The condensation-polymerization may be carried out in an inert solvent such as water, alcohols or phenols including cresols and xylenols.

It is possible to control the degree of polymerization of the formed polymer in the conventional manner by the addition of an appropriate amount of a mono-functional compound or a dicarboxylic acid to the reaction system. The former compound includes, for example, a monocarboxylic acid such as acetic acid, benzoic acid and the like, and a primary amine such as monomethyl amine, monoethyl amine and the like, and the latter includes adipic acid, sebacic acid and the like.

The degree of polymerization is increased when the condensation-polymerization reaction is conducted under normal pressure or pressurized conditions at an earlier stage of the reaction and under reduced pressure at a later stage of the reaction. Also, the reaction should be carried out in an inert gas such as steam, carbon dioxide, nitrogen, hydrogen, argon, etc. so as to avoid the appearance of color in the desired reaction product due to oxidation by air.

Alternatively, a solution of the starting material 4-(3-aminopropoxy)-phenyl-3-propylamine dissolved in alcohol or water can be mixed with an approximately equimolar amount of the dicarboxylic acid or an alcoholic solution thereof to produce a polyamide intermediate, i.e., a salt complex which is then isolated and, if necessary, purified and thereafter subjected to the condensation-polymerization under the same conditions as above.

Also, the polymer can be produced by the interfacial condensation-polymerization method which comprises mixing, while stirring, a solution of the dicarboxylic acid dichloride in a water-immiscible inert solvent with an aqueous solution of a hydrochloric acid acceptor such as sodium hydroxide, into which has been dissolved the diamine starting material or by the low-temperature solution polymerization method which comprises reacting the diamine starting material with the dicarboxylic acid dichloride separately dissolved in a solvent which is inert for the respective reactant such as, for example, dimethylformamide, dimethylacetamide and the like, either in the presence or the absence of a hydrochloric acceptor such as triethylamine.

The polymer obtained by the method described above is formed by the condensation reaction of diamine containing one paraoxyphenylene group with dicarboxylic acid. As in this reaction dicarboxylic acid can freely connect with either the amino group in the head position or the amino group in the tail position of the diamine, the following two combinations are possible:

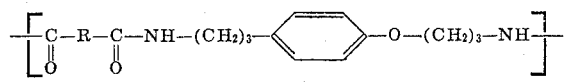

or

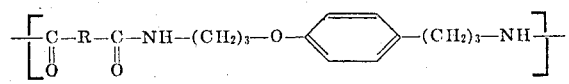

Consequently, the polymer of the present inventions comprises a chain of

units and

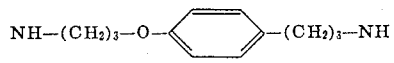

units wherein the imino-propoxy radical, —NH—(CH$_2$)$_3$, in the latter units may face randomly to the left and right on the p-phenylene radical. This polymer, however, is crystalline and is a resinous substance and is moreover characterized in that it melts at a relatively low temperature. Although the polymer is rich in benzene nuclei in the main chain thereof, said polymer has a relatively low melting temperature which makes it possible to easily effect molding of the molten polymer. This is due to the molecular structure of said polymer in which the monomer units are randomly distributed in said polymer chain. Accordingly, the polymer can be fabricated into a film having a high tenacity, or can be melt-spun into a fiber having a high stiffness in the usual manner.

The features of the polymer prepared from 4-(3-aminopropoxy)-phenyl-3-propylamine and various dicarboxylic acids are shown in Table 1 below.

TABLE 1

| Dicarboxylic Acid or Derivative Thereof | Appearance | Melting Point (°C)* | Glass Transition Temp. (°C)** |
|---|---|---|---|
| Adipic Acid | light yellow, opaque, stiff | 199 | 87 |
| Sebacic Acid | milk-white, opaque, stiff | 182 | 88 |
| Decamethylene-1,10-dicarboxylic Acid | lightly colored, opaque | 160 | |
| Terephthalic Acid | milk-white, opaque | 275 | 100 |
| Isophthalic Acid | colorless, transparent | | 121 |
| 4,4-Dicarboxy-diphenoxy-1,2-ethane | milk-white, opaque | 267 | 100 |

\* The temperature at which distinct vision of the spherulite disappears is measured by means of a polarizing microscope and is considered as a melting temperature.
\*\* Measured by the dilatometer method.

The polymer of the present invention shows high glass-transition temperature quite superior to that of conventional aliphatic polyamides, for example, Nylon 66. This is due to the fact that the polymer of this invention contains both benzene nuclei derived from the diamine constituents and oxygen bonds in the main chain thereof.

Since a resin generally does not vary in its mechanical characteristic at temperatures under its glass transition temperature, a resin having a high glass transition temperature such as the polymer of this invention shows a relatively high modulus of elasticity and a so-called "high stiffness" property, and is additionally superior in impact resistance.

The polyamide of this invention was found to be superior in dyeing properties for acid dyes as compared with conventional Nylon and was proved to be an extremely useful substance for the production of fibers and films.

The following examples illustrate the present invention but are not to be construed as a limitation of the scope of this invention.

EXAMPLE 1

A solution of 20.8g (0.1 mole) of 4-(3-aminopropoxy) phenyl-3-propylamine dissolved in 200 ml of ethanol was mixed with a solution of 14.6g (0.1 mole) of adipic acid dissolved in 500 ml of ethanol and allowed to stand to give a crystalline precipitate of the polyamide intermediate having a melting point of 141° to 145°C. 7.09g (0.02 mole) of the thus obtained intermediate, 0.0122g (0.0001 mole) of benzoic acid and 1.5 ml of water were charged into a stainless steel pressure container which was then purged with nitrogen gas to make a nitrogen atmosphere and sealed. The reaction was effected by immersing the container in an oil bath at 240°C, and after 3 hours the pressure was gradually reduced by discharging the gas from the container while maintaining that temperature, and the reaction mixture was then heat-treated for an additional 5 hours under the reduced pressure to yield a resinous substance which was light yellow in color, opaque and oa high stiffness. The polymer showed a limiting viscosity number of 0.67 as measured in m-cresol solution at 25°C and can be used for the formation of film and melt-spinning.

A polymer having the same quality as above was obtained when the procedure described in Example 1 was repeated under the same conditions but substituting a hydrogen or carbon dioxide gas for the nitrogen gas.

EXAMPLE 2

A solution of 38.1g (0.183 mole) of 4-(3-aminopropoxy) phenyl-3-propylamine dissolved in 200 ml of ethanol was mixed with a solution of 37.0g (0.183 mole) of sebacic acid dissolved in 800 ml of ethanol, and the resulting mixture was allowed to stand to give a crystalline precipitate of the polyamide intermediate having a melting point of 176° to 177°C. To 11.52g of the thus obtained intermediate was added 0.0084 mg of acetic acid in a 0.04 molar water solution, and the mixture was charged into a pressure container which was then purged with nitrogen gas to make a nitrogen atmosphere and thereafter sealed. The reaction was effected for 5 hours immersing the container in an oil bath at 220°± 5°C, and thereafter the pressure was reduced slowly over a period of one hour while maintaining that temperature. The pressure was further reduced to about 30mmHg where the reaction mixture was heat-treated for an additional 20 hours to yield a resinous substance which was milk-white and opaque and of high stiffness, having a limiting viscosity number of 1.06 (as measured in an m-cresol solution at 25°C). The X-ray diffraction pattern of the resulting polymer exhibited a specific one due to the crystalline highpolymer. The polymer had a melting temperature of 182°C and was useful for the formation of film and for melt-spinning. For example, the fibers obtained by melt-spinning the polymer through a single-hole nozzle at 195°C was drawn to eight times its original length in an air bath at 60°C to give the fibers having a fineness of 4.8 denier, a tensile strength of 4.52g/den., 29 percent elongation, and an initial modulus of elasticity of 290 Kg/mm$^2$. These fibers exhibited the same degree of dyeability for acid dyes as Nylon 6 and were highly resistant to sunlight and ultraviolet irradiation. No yellowing, as is commonly observed in such fibers, was observed, even after exposure to natural light for a period of more than one year.

EXAMPLE 3

20.83g of the distilled 4-(3-aminopropoxy)phenyl-3-propylamine (b.p., 158° to 162°C/1.0 mmHg), 20.22g of sebacic acid, 0.061g of benzoic acid and 5 ml of water were charged into a pressure container, which was then purged with nitrogen gas to make a nitrogen atmosphere and sealed. It was then heated in an oil bath having a temperature of 220°C for 5 hours, after which the pressure in the container was reduced by slowly discharging the gas; then the reaction mixture was further heat-treated under the reduced pressure to effect the condensation-polymerization. The polymer obtained had substantially the same quality as that obtained in Example 2.

EXAMPLE 4

2.08g of 4-(3-aminopropoxy)phenyl-3-propylamine was dis-solved in 15 ml of ethanol and mixed with a solution of 2.30g of decamethylene-1,10-dicarboxylic acid in ethanol to give a white crystalline polyamide intermediate having a melting point of 184° to 186°C which was then heated at 230°C for 5 hours in a nitrogen atmosphere to give a polymer as a white resinous substance. The resulting polymer has a melting temperature of 160°C and can be used for the formation of film and for melt-spinning.

EXAMPLE 5

1.041g of the distilled 4-(3-aminopropoxy)phenyl-3-propylamine, 5 ml of methanol and 0.971g of terephthalic acid dimethyl ester were charged into a closed container, which had been purged with nitrogen gas, and heated by gradually raising the temperature to 240°C where the mixture was maintained for 2 hours. The pressure in the container was then reduced by dischargin the gas while keeping that temperature and then further reduced to about 30mmHg where the mixture was heat-treated for 1 hour to give a colorless transparent resin.

A polymer can also be obtained following the same procedure as above but using isophthalic acid diethyl ester in place of the terephthalic acid dimethyl ester.

EXAMPLE 6

4.75g of the distilled 4-(3-aminopropoxy) phenyl-3-propylamine, 3.80g of the ground pure terephthalic acid and 10 ml of distilled water were charged into a pressure container which was then purged with nitrogen gas to make a nitrogen atmosphere and sealed. The temperature of the container was then raised to 240°C and, after 30 minutes at that temperature, was further raised to 260°C over a period of about 1 hour while discharging the gas from the container. The reaction mixture was then heat-treated while keeping the latter temperature under the reduced pressure of 1 mmHg for 30 minutes to give a white, opaque, resinous substance. This substance, a crystalline polymer, had a softening point of 258° to 262°C and an inherent viscosity (hereinafter abbreviated as $\eta$ inh.) of 0.40 as measured in 0.5 percent m-cresol solution at 25°C. The polymer showed excellent spinability, and the fiber obtained from the polymer by the melt-spinning had a remarkably increased strength after it was drawn on a heat-plate at about 100°C.

EXAMPLE 7

4.16g of 4-(3-aminopropoxy)phenyl-3-propylamine was dissolved in 40 ml of distilled water, and 3.32g of terephthalic acid was added thereto and heat-dissolved by heating in a water bath. The mixture was then allowed to stand to precipitate a white crystalline substance having a melting point of 256°C. The separated and dried substance was charged into a pressure container and heat-treated in a nitrogen atmosphere in the same manner as in Example 6 to give a polymer having the same quality as that obtained in Example 6. The resulting polymer had an $\eta$inh. of 0.53.

The polymer thus obtained was then melt-spun through a single-hole nozzle, and the resulting fibers were drawn to 4.91 times their original length in a water bath at 60°C and subjected to heat-treatment under tension to give fibers having a tensile strength of 2.18 g/den., 25 percent elongation, and an initial modulus of elasticity of 416 Kg/mm$^2$. The equilibrium moisture-absorbability at 100 percent relative humidity was about 6.0 percent (at 20°C).

The same procedure as above was repeated using isophtalic acid in place of terephthalic acid to give a colorless transparent polymer softening at 126°C.

EXAMPLE 8

5.82g of the distilled 4-(3-aminopropoxy)phenyl-3-propylamine and 4.64g of highly pure terephthalic acid were charged into a pressure container which was then purged with nitrogen gas to make a nitrogen atmosphere and sealed. The container was then placed in an oil bath, and the temperature was raised slowly to 270°C over a period of 4 hours. After 2 hours at that temperature, the pressure in the container was reduced by discharging the gas. When the pressure was reduced to 30 mmHg, the temperature was raised to 280°C where the reaction mixture was heat-treated. The resulting polymer had an η inh. of 0.30.

EXAMPLE 9

9.05g of the polyamide intermediate obtained in Example 2 was placed in a flask having a glass side-arm equipped with a capillary for the introduction of gas, and, after purging with nitrogen gas to make a nitrogen atmosphere in the flask, the reaction was effected by immersing the flask in an oil bath at 220°± 5°C for 5 hours under a slow stream of nitrogen gas. At this point, the reaction mixture became viscous, and a sample taken from the reaction mixture was a resinous substance having high stiffness. In order to complete the reaction, the stream of nitrogen gas was discontinued and the mixture was heated while keeping a temperature of 220°C under a reduced pressure of about 30 mmHg for 2 hours to give a milk-white, opaque resinous substance having high stiffness.

EXAMPLE 10

10.47 of 4-(3-aminopropoxy)phenyl-3-propylamine was dissolved in 500 ml of distilled water, and 15.14g of the ground 4,4'-dicarboxydiphenoxy-1,2-ethane was added thereto. After it was heat-dissolved on a water bath, the mixture was filtered while hot and allowed to cool to yield 16.0g of flake crystals having a melting temperature of 235° to 239°C. 10.0g of the intermediate thus obtained was placed in a heat-resisting container which was then purged with nitrogen gas to make a nitrogen atmosphere and sealed. After being heated at 240°C for 2 hours, the pressure was gradually reduced by discharging the gas and further reduced to 1 mmHg where the reaction mixture was slowly heated to 260°C over a period of 1 hour while keeping the 1 mmHg pressure to give a white opaque polymer. The resulting polymer had a softening point of 241° to 247°C and a melting temperature of 267°C in the form of spherulite and showed an excellent melt-spinning property. The fibers obtained from the polymer by melt-spinning exhibited a remarkably increased strength after it was drawn on a heat-plate at a temperature higher than 100°C.

EXAMPLE 11

0.447g of the diamine, 0.6459g of 4,4'-dicarboxydiphenoxy-1,2-ethane and 2 ml of distilled water were charged into a glass tube, and the mixture was slowly heated up to 240°C over a period of 1 hour in a nitrogen atmosphere and at atmospheric pressure while stirring periodically the contents of the tube to keep the mixture uniform. After the temperature reached 240°C, the pressure in the tube was gradually reduced and the reaction mixture was then kept at 1 mmHg pressure and and 250°C for a period of 30 minutes to give a white opaque resinous substance. The resulting polymer had substantially the same quality as that obtained in Example 10.

EXAMPLE 12

6.00g of 4-(3-aminopropoxy)phenyl-3-propylamine was dissolved in 60 ml of water, and the resulting solution was mixed with 4.86g of terephthalic acid followed by being heat-dissolved. The mixture was then filtered while hot, and the filtrate was allowed to stand to yield a white crystalline precipitate of the polyamide intermediate. The precipitation can be promoted by the addition of methanol or ethanol if it occurs too slowly. 0.464g of the thus obtained intermediate was then placed in a glass tube which was then sealed after purging with nitrogen gas to make a nitrogen atmosphere. The tube was then placed in a silicon oil bath at 280°C, and the temperature of the bath was increased to 297°C where the tube was opened. The pressure was then reduced to 5 mmHg where the reaction product was treated for 30 minutes. The resulting polymer was light brown and opaque and had an ηinh. of 0.40.

EXAMPLE 13

16.016g of the polyamide intermediate prepared in the same manner as Example 12, 0.032g of adipic acid and 10.0 ml of water were charged into a pressure container which was then sealed after purging with nitrogen gas to make a nitrogen atmosphere. The container was then placed in an oil bath heated at 260°C, and the temperature of the bath was raised to 270°C over a period of about 3 hours. After maintaining that temperature for 15 hours, the inside pressure reached approximately 25 Kg/cm². The pressure was then reduced slowly while keeping the temperature of 270°C over a period of about 3 hours followed by a further reduction to 30 mmHg where the reaction product was heated for an additional 9 hours, the final temperature of the heating being 280°C. The polymer thus produced was a brown and opaque resin and had an inherent viscosity of 0.29.

We claim:

1. A linear film and fiber forming polyamide having a high glass transition temperature composed essentially of randomly repeating units having the formula:

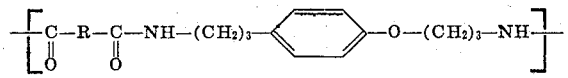

and

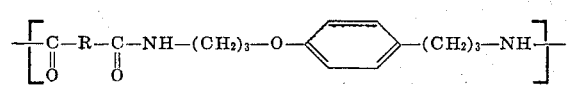

wherein R is a member selected from the group consisting of aliphatic, aromatic and aliphatic-aromatic divalent radicals.

* * * * *